T. G. VAN SANT.
MOTOR VEHICLE.
APPLICATION FILED JUNE 27, 1914.
1,156,853.
Patented Oct. 12, 1915.
2 SHEETS—SHEET 1.
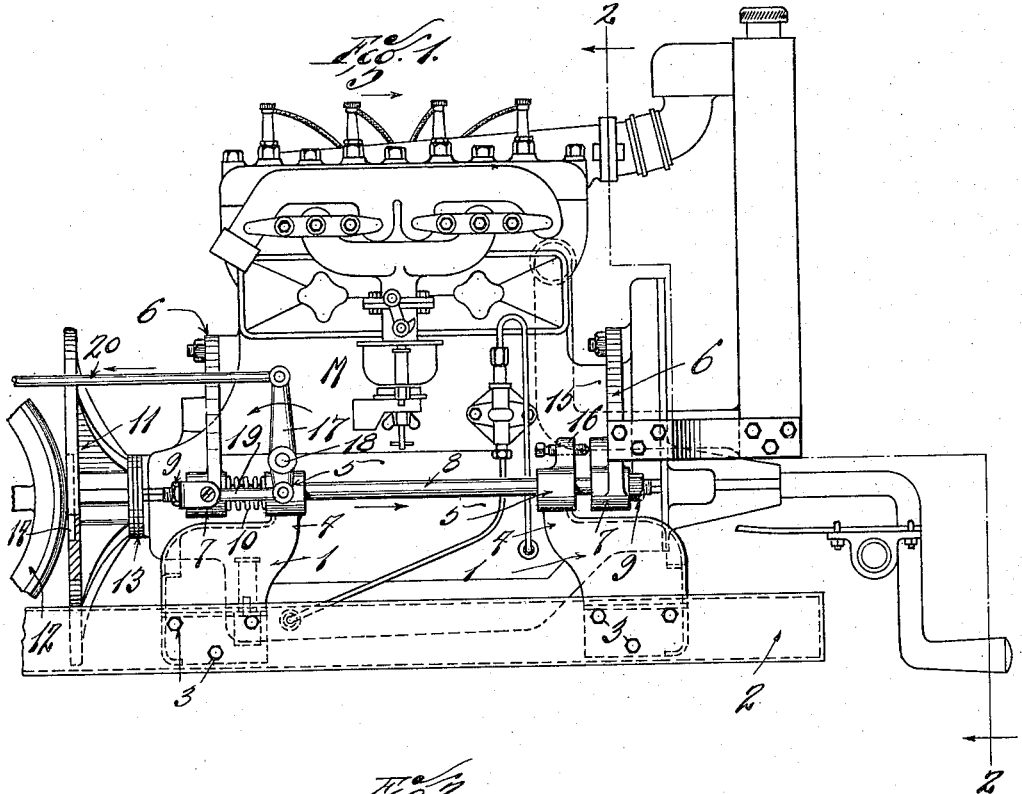
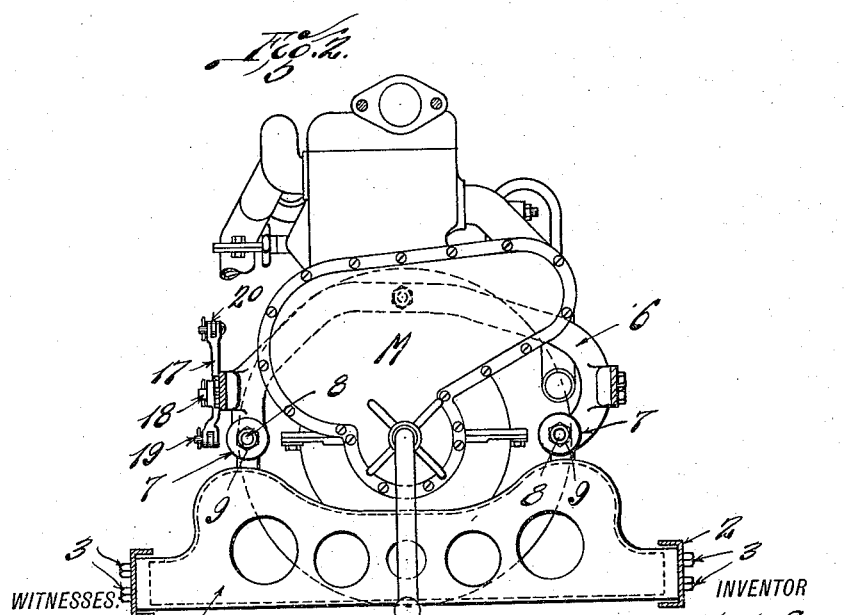
WITNESSES.
INVENTOR
Thomas G. Van Sant,
BY
Rippey Kingsland
ATTORNEYS T. G. VAN SANT.
MOTOR VEHICLE.
APPLICATION FILED JUNE 27, 1914.
1,156,853.
Patented Oct. 12, 1915.
2 SHEETS—SHEET 2.
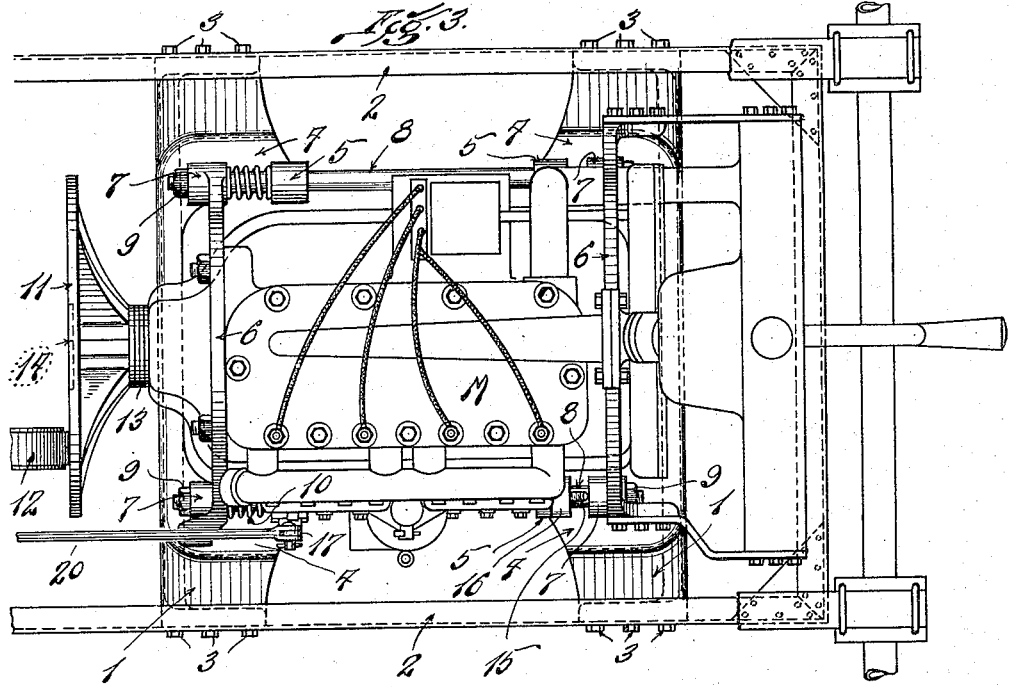
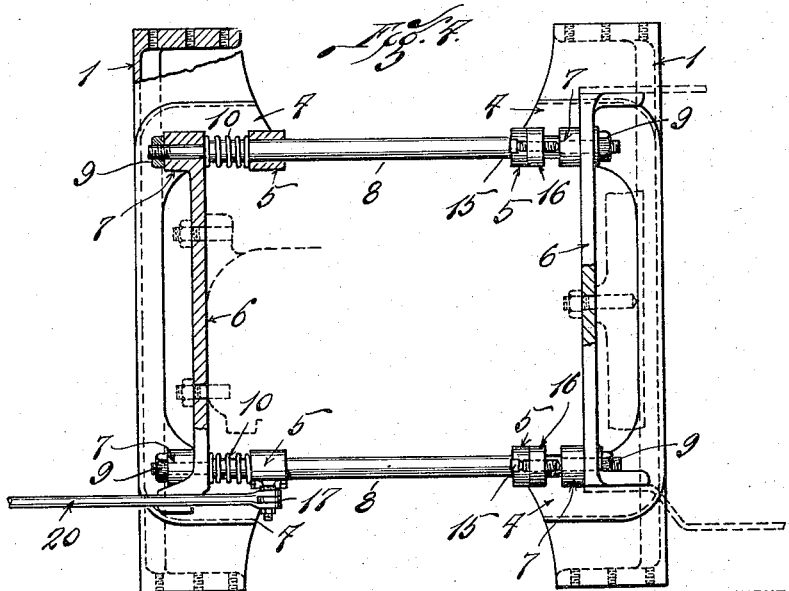
WITNESSES:
INVENTOR
THOMAS G. VAN SANT.
BY
Rippey & Kingsland
ATTORNEYS

UNITED STATES PATENT OFFICE.

THOMAS G. VAN SANT, OF POPLAR BLUFF, MISSOURI, ASSIGNOR OF ONE-HALF TO SAMUEL G. DORMAN, OF POPLAR BLUFF, MISSOURI.

MOTOR-VEHICLE.

1,156,853.  Specification of Letters Patent.  Patented Oct. 12, 1915.

Application filed June 27, 1914. Serial No. 847,754.

*To all whom it may concern:*

Be it known that I, THOMAS G. VAN SANT, a citizen of the United States, residing at the city of Poplar Bluff, in the county of Butler and State of Missouri, have invented a new and useful Motor-Vehicle, of which the following is a specification.

This invention relates to motor vehicles, and more particularly to an improved mounting for the engine of the vehicle and its associated parts whereby the same may be moved relatively to the frame of the vehicle.

An object of the invention is to provide an engine mounting permitting the relative movement of the engine and its associated parts with respect to the vehicle frame.

Another object of the invention is to provide automatic means for actuating the engine and its associated parts in one direction, in combination with manually controlled means for actuating the engine and its associated parts in the other direction.

Another object of the invention is to provide an engine mounting having associated therewith a driving friction disk whereby said friction disk may be brought into and out of coöperative relationship with a driven friction wheel by moving the engine automatically toward the friction wheel and manually away from said friction wheel, said mounting being so constructed and arranged that the pressure of the friction disk against the friction wheel will be increased when the motor vehicle is traveling upwardly on an incline and the pressure will be relieved or lessened when the motor vehicle travels downwardly on an incline.

Another object of the invention is to provide suitable means for moving the engine, having associated therewith a driving friction disk, into and out of coöperative position with a driven friction wheel and for varying the relative coöperative positions of the driving disk and friction wheel, whereby the speed and direction of rotation of said driven friction wheel may be controlled selectively and at the will of the operator.

Other advantages and novel features resulting from and residing in the construction of the present invention will be obvious to those skilled in the art, from the following detailed disclosure, taken in connection with the accompanying drawings, in which—

Figure 1 is a side elevation of an engine and its associated parts mounted upon a support embodying a preferred form of the present invention. Fig. 2 is a transverse vertical section taken on the line 2—2 of Fig. 1, viewing the engine and the mounting therefor from the forward end. Fig. 3 is a plan view of the engine and its associated parts supported by the engine mounting embodying the present invention. Fig. 4 is a plan view of the engine mounting structure, a part being broken away.

In the drawings, in which I have illustrated one embodiment of my invention, a pair of spaced yokes 1 are supported transversely of the side members 2 of the chassis of the vehicle. The ends of the yokes 1 are rigidly secured to the side members in any suitable manner and, as illustrated, the means employed comprises a plurality of bolts 3 passing through the side walls of the members 2, the ends of the yokes being seated between horizontal walls of the channel bars constituting the side members. The yokes 1 are provided at either side with upwardly extending brackets 4 in which are formed bearings 5.

Bolted to each end of the case of the engine M are cross heads or plates 6. I prefer to utilize a single bolt for securing the engine to the forward cross head and two bolts for securing the engine to the rearward cross head, as clearly illustrated in Fig. 4 of the drawing, thus providing a three-point support between the motor and the cross heads.

Each of the cross heads is provided with hubs 7 adjacent to the lower corners thereof, the hubs on each side being longitudinally alined. A pair of rods 8 extend parallel with the side of the engine case and with each other and are removably, but rigidly, secured at each end to the cross heads, said rods projecting through the hubs a slight distance, and being threaded to receive nuts 9.

In mounting the engine the rods 8 are passed through the bearings 5 and then secured in proper adjustment by the nuts 9, The rods 8 are thus held in rigid horizontal adjustment between the hubs 7. It will be apparent that this arrangement permits the engine to be moved longitudinally, the rods 8 sliding in the alined rigid bearings 5. Encircling the rods 8 and interposed intermediate the bearings 5 of the rearward yoke and the hubs 7 in the rearward cross head 6 are strong expansion springs 10, the tendency of which is to slide the engine and its associated parts rearwardly.

To the end of the main shaft of the engine, which projects rearwardly therefrom, is secured a friction driving disk 11, the face of which is disposed in a vertical plane transversely of the chassis of the vehicle. A driven friction wheel 12 is arranged in coöperative adjustment with said driving disk, the periphery of said driven wheel being movable transversely across the face of the friction disk. The driven friction wheel 12 has transverse movement but is permanently fixed with respect to its relative longitudinal position in the chassis of the vehicle. The tendency of the springs 10 is to actuate the engine rearwardly and to force the driving friction disk 11 against the periphery of the driven friction wheel 12. An anti-friction end-thrust bearing 13 may be mounted on the main shaft intermediate of the friction disk 11 and the engine case if desired, thus eliminating the end thrust of the main shaft. A depression or recess 14 is formed in the face of the friction disk, said recess being concentric with the axis of the friction disk. The rearward movement of the friction disk is limited by adjustable abutments comprising set screws 15 projecting forwardly through lugs 16 formed on the bearings 5 of the forward yoke 1. Thus, it will be observed that when the driven friction wheel 12 is moved to a position so that its periphery is opposite the recess 14 in the friction disk 11, there will be no coöperative contact between the friction disk 11 and said driven friction wheel 12. I also provide manual means for moving the engine and its associated parts, which includes the friction disk 11, out of coöperative relationship with the driven friction wheel 12 against the normal tendency of the springs 10. Any suitable means for this purpose can be employed and I have shown one satisfactory construction. As I have illustrated this construction in the drawings it comprises a lever 17 fulcrumed mediate of its ends on a stud 18 formed on one of the bearings of the rearward yoke 1. One end of said lever 17 is connected to one of the hubs 7 of the rearward cross heads 6 by a link 19. The opposite end of the lever is connected to an operating rod 20 which may be operated through any form of manual operating means, such as a foot lever or a hand lever, the construction of which is well known and therefore not shown in the present disclosure.

From the foregoing it will be observed that the construction of the present invention is simple and durable and that it may be operated with facility. In driving a car the operator may readily, either through a hand lever device or foot lever, shift the motor and its associated parts including the friction disk 11 forwardly against the tension of the springs 10 so that the friction disk will be out of contact with the driven friction wheel. In this adjustment the driven friction wheel may be readily moved across the face of the friction disk, so that the speed of the vehicle and its direction of rotation may be readily and precisely determined.

The mechanism whereby the friction wheel 12 is moved across the face of the friction disk is made the subject matter of a copending application filed by me on the 27th day of June, 1914, and numbered serially 847752, and is therefore not disclosed herein. It will be apparent, however, from the present disclosure that the precise speed of the vehicle may be determined by the selective adjustment of the friction drive elements, and that the friction drive elements may be so adjusted that, when moved automatically to coöperative adjustment, upon the release of the mechanism operating in opposition to the springs 10, the machine may be driven in either direction at selected speeds. The friction drive elements may also be adjusted so that both the friction disk and the driven friction wheel may independently rotate without making contact, after the manual mechanism operating in opposition to the springs 10 has been released.

Under normal conditions of operation and when the vehicle is traveling on a level road, the springs 10 will hold the friction drive elements in contact with each other with sufficient force to transmit the power of the engine to the transmission mechanism. If, however, the vehicle is traveling upwardly on an incline the weight of the engine sliding rearwardly on its mounting will supply additional force for holding the friction drive elements in contact. Likewise, it will be apparent that in traveling downwardly on an incline the engine will tend to move forwardly and lessen or release the force with which the friction drive elements are held in contact. The increase or decrease of force will be proportionate to the angle of incline over which the vehicle may be traveling.

I am aware that various modifications in the structure may be made without departing from the spirit and scope of the invention and I do not limit myself, therefore, to exact details, but

What I claim and desire to secure by Letters Patent is:—

1. In a motor vehicle, the combination with a chassis, and a friction wheel supported on an axis transversely of the chassis, of supporting members extending longitudinally of the chassis, guides upon which said supporting members are movable longitudinally of the chassis, a motor supported by and movable with said supporting members longitudinally of the chassis, a driving friction disk mounted on an axis extending longitudinally of the chassis driven by said motor and movable longitudinally with said motor, means actuating said motor in a direction longitudinally of the chassis effectively to hold said driving friction disk in contact with said friction wheel, and manipulative means for moving said supporting members and thereby said motor and said friction disk longitudinally of the chassis in a direction away from said friction wheel.

2. In a motor vehicle, the combination with a chassis having longitudinally extending side members, yokes rigidly supported by said side members, a driven friction wheel supported in a fixed longitudinal adjustment with respect to said chassis, a motor, cross heads secured to said motor, bearings formed in said yokes, rods secured to said cross heads and being movable in said bearings, a driving element associated with said motor, automatic means actuating said motor toward said driven wheel, and manual means for moving said motor away from said driven wheel, substantially as specified.

3. In a motor vehicle, the combination with a chassis, of yokes rigidly supported by said chassis, bearings formed at each side of said yokes, rods secured to the motor at either side and adapted to slide in said bearings, springs actuating said rods in one direction with respect to said yokes, and manual means for actuating said rods in the opposite direction in opposition to said springs.

4. In a motor vehicle, the combination with a chassis having side members, longitudinally alined brackets at each side of said chassis rigidly supported by said side members, a motor, supports for said motor, said supports including a pair of longitudinally arranged parallel rods slidably mounted in said bearings, automatic means for shifting said supports and thereby said motor in one direction, adjustable abutments limiting the automatic movement of said supports and said motor, and manual means for shifting said supports and said motor in the opposite direction, substantially as specified.

5. In a motor vehicle, the combination with a chassis, and a friction wheel whose axis extends transversely of the chassis, of bearings near each side of the chassis, supporting members supported by said bearings and slidable on said bearings longitudinally with respect to the chassis, a support mounted on said supporting members and movable therewith longitudinally of the chassis, and a friction disk carried by said support, means actuating said support in a direction longitudinally of the chassis to position to contact said friction disk with said friction wheel, manipulative means operable to slide said supporting members on said bearings longitudinally of the chassis to move said friction disk out of contact with said friction wheel, and a motor for actuating said friction disk.

6. In a motor vehicle, the combination with a chassis, and a friction wheel, of a support, bearings upon which said support is slidable longitudinally of the chassis, a friction disk carried by said support, a motor for actuating said friction disk, manipulative means for sliding said support upon said bearings longitudinally of the chassis in a direction to move said friction disk away from said friction wheel, and automatic means for sliding said support upon said bearings longitudinally of the chassis in a direction to move said friction disk into contact with said friction wheel.

7. In a motor vehicle, the combination with a chassis, and a friction wheel, of a number of longitudinally alined bearings adjacent to each side of the chassis, a supporting member slidably mounted in the the alined bearings near each side of the chassis, a motor supported by said supporting members, a friction disk driven by said motor and supported by said supporting members, manipulative means for sliding said supporting members longitudinally in said bearings in a direction to move said friction disk away from said friction wheel, and automatic means for sliding said supporting members longitudinally in said bearings in a direction to move said friction disk into contact with said friction wheel.

8. In a motor vehicle the combination with a chassis, and a friction wheel adapted to be moved transversely of the chassis, of bearings mounted upon the chassis, a support carried by said bearings and slidable longitudinally of the chassis, a friction disk carried by said support and having a concentric recess in the face thereof, automatic means for sliding said support upon said bearings longitudinally of the chassis in a direction to move said friction disk into contact with said friction wheel, manipulative means for sliding said support upon said bearings longitudinally of the chassis in opposition to said automatic means in a direction to move said friction disk away from said friction wheel, and a motor mounted in said support for actuating said friction disk.

9. In a motor vehicle, the combination with an engine, of rods secured in horizontal adjustment at either side of and supporting said engine, brackets rigidly secured to the side members of the chassis of the vehicle adapted to slidably support said rods, springs for actuating said rods in one direction with respect to said brackets, and manually operable means adapted to actuate said rods in the other direction in opposition to said springs, substantially as specified.

10. In a motor vehicle, the combination with a plurality of brackets longitudinally alined in pairs and rigidly secured to the side members of the chassis of the vehicle, rods slidably supported by said brackets, plates secured to said rods and disposed transversely thereof, an engine supported by said plates, springs encircling said rods intermediate one of said plates and a bracket on each side of the vehicle, a lever, connections between said lever and one of said plates, and manual means for operating said lever effectively to move said rods and said plates in opposition to said springs.

11. In a motor vehicle, the combination with a chassis, longitudinally alined supports rigid with the side members of the chassis, and a frame slidable longitudinally of the chassis in said supports, of automatic means for actuating said frame in one direction, manually operable means for moving said frame in the opposite direction in opposition to said automatic means, a driven member supported by the chassis, and a driving member supported by said frame and movable into and out of contact with said driven member and normally retained in contact with said driven member by said automatic means.

12. In a motor vehicle, the combination of a pair of brackets having longitudinally alined bearings supported on each side member of the chassis of the vehicle, a frame, slidably mounted in said brackets, adapted to support the engine of the vehicle, adjustable abutments, mounted in one of the brackets on each side of the vehicle, adapted to limit the movement of said frame in one direction, automatic means actuating said frame against said abutments, and means for moving said frame in the opposite direction, substantially as specified.

13. In a motor vehicle, the combination with a chassis having side members, longitudinally alined brackets at each side of said chassis rigidly supported by said side members, bearings, coaxially alined, supported by said brackets, a slidable frame mounted in said brackets, a three-point support between said frame and the engine of the vehicle, an engine having a friction drive disk extending beyond the rearward end of said frame, means limiting the rearward movement of said frame, automatic means actuating said frame rearwardly, and manual means for moving said frame in the opposite direction, substantially as specified.

14. In a motor vehicle, the combination with an engine having a rearwardly extending main shaft, a friction disk on said main shaft, an anti-friction end-thrust bearing between said friction disk and the engine case, a frame supporting said engine, a three-point connection between said engine and said frame, springs actuating said frame rearwardly, and manual connections for operating said frame forwardly in opposition to said springs, substantially as specified.

15. In a motor vehicle, the combination with a chassis, a pair of axially alined bearings rigidly secured to each side member of the chassis and projecting upwardly therefrom, rods slidably mounted in each pair of bearings, plates rigidly supported transversely of said rods, an engine, rigid connections between said engine and said plates, springs interposed between one of said plates and one of said bearings on each side, and a lever operatively connected to one of said plates, adapted through manual connections, to move said plate in opposition to said springs, substantially as specified.

16. In a motor vehicle, the combination with a chassis including side members, supports carried by the side members of the chassis, and a frame slidable in a rectilinear plane in said supports longitudinally of the chassis, of automatic means for actuating said frame in one direction, manually operable means for moving said frame in the opposite direction in opposition to said automatic means, a driven member, a driving member supported by said frame and retained in contact with said driven member by said automatic means, and a motor device for operating said driving member.

In witness whereof, I have signed this specification in the presence of two subscribing witnesses.

THOMAS G. VAN SANT.

Witnesses:
 REYE V. LOWRY,
 W. S. RANDALL.

Copies of this patent may be obtained for five cents each, by addressing the "Commissioner of Patents, Washington, D. C."